(12) United States Patent
Nielsen et al.

(10) Patent No.: US 6,506,424 B2
(45) Date of Patent: Jan. 14, 2003

(54) MULTICOLORED CHEWING GUM WITH CRUNCHY TRANSPARENT COATING

(75) Inventors: Hans Erik Nielsen, Hovegaard (DK); Nesim Acar, Istanbul (TR); Albert Levy, Istanbul (TR)

(73) Assignee: Dandy Sakiz ve Sekerleme Sanayi A.S., Istanbul (TR)

( * ) Notice: Subject to any disclaimer, the term of this patent is extended or adjusted under 35 U.S.C. 154(b) by 63 days.

(21) Appl. No.: 09/851,220

(22) Filed: May 8, 2001

(65) Prior Publication Data

US 2002/0018829 A1 Feb. 14, 2002

Related U.S. Application Data

(60) Provisional application No. 60/206,200, filed on May 22, 2000.

(51) Int. Cl.⁷ .................................................. A23G 3/30
(52) U.S. Cl. ........................ 426/5; 426/103; 426/104
(58) Field of Search .......................... 426/5, 104, 250, 426/103, 302, 262, 3, 660; 424/48, 479, 481

(56) References Cited

U.S. PATENT DOCUMENTS

| | | | |
|---|---|---|---|
| 4,146,653 A | | 3/1979 | Mader et al. |
| 4,317,838 A | | 3/1982 | Cherukuri et al. |
| 4,352,823 A | | 10/1982 | Cherukuri et al. |
| 4,753,790 A | * | 6/1988 | Silva et al. |
| 4,786,243 A | | 11/1988 | Kehoe |
| 4,834,986 A | | 5/1989 | Glass et al. |
| 4,835,000 A | | 5/1989 | Kehoe |
| 5,116,626 A | * | 5/1992 | Synosky et al. |
| 5,135,761 A | | 8/1992 | Dave et al. |
| 5,376,389 A | * | 12/1994 | Reed et al. |
| 5,436,013 A | | 7/1995 | Synosky et al. |
| 5,437,877 A | | 8/1995 | Synosky et al. |
| 5,437,879 A | | 8/1995 | Kabse et al. |
| 5,441,750 A | | 8/1995 | Synosky et al. |
| 5,536,511 A | | 7/1996 | Yatka |
| 5,603,970 A | | 2/1997 | Tyrpin et al. |
| 5,626,892 A | | 5/1997 | Kehoe et al. |
| 5,955,116 A | | 9/1999 | Kehoe et al. |

FOREIGN PATENT DOCUMENTS

| | | | |
|---|---|---|---|
| DE | 42 29 897 A1 | * | 3/1997 |
| EP | 0 447 733 A1 | * | 9/1991 |
| JP | 57022646 | * | 2/1982 |
| JP | 60072784 | * | 4/1985 |
| JP | 62201544 | * | 9/1987 |

\* cited by examiner

*Primary Examiner*—Keith Hendricks
(74) *Attorney, Agent, or Firm*—Alston & Bird LLP

(57) ABSTRACT

A gum product comprises a soft gum core having a plurality of regions of different colors visible on an outer surface of the core, and a crunchy edible coating covering the outer surface of the core, the coating being substantially transparent such that the core regions of different colors are visible through the coating. The regions of different colors can also have different flavors. The coating preferably is formed of sorbitol and is free of any whitening agents that would make the coating opaque.

14 Claims, No Drawings

MULTICOLORED CHEWING GUM WITH CRUNCHY TRANSPARENT COATING

CROSS-REFERENCE TO RELATED APPLICATION

This application claims the benefit of the filing date of U.S. Provisional Patent Application Ser. No. 60/206,200 filed May 22, 2000.

FIELD OF THE INVENTION

The invention relates to chewing gum. The invention relates more particularly to a coated chewing gum product that is co-extruded or otherwise manufactured so that it has two or more portions that are of different colors.

BACKGROUND OF THE INVENTION

Multicolored chewing gum products, in which a given piece of gum has two or more portions of different colors, are known. For example, U.S. Pat. No. 4,352,823, the disclosure of which is incorporated herein by reference, discloses a co-extruded gum that has an extruded center portion surrounded by and bonded to an extruded outer shell portion. Additionally, U.S. Pat. Nos. 5,626,892, 5,437,879, 4,835,000, and 4,834,986, the disclosures of which are incorporated herein by reference, disclose various multicolored gum products, some of which are also multiflavored, the different colors corresponding to different flavors.

It is also known to coat a gum product with a hard shell or crunchy coating. For example, U.S. Pat. No. 4,753,790, the disclosure of which is incorporated herein by reference, discloses a chewing gum having a hard shell formed from sorbitol. Additionally, U.S. Pat. Nos. 5,603,970 and 5,376,389, the disclosures of which are incorporated herein by reference, disclose gum products having hard coatings of erythritol, xylitol, and other polyols. Such coatings are typically applied to ball-type or pellet-type gum products, and generally have a solid opaque color provided by various additional ingredients in the coating composition, such as film forming agents, binding agents, whiteners, food colors, and similar ingredients.

SUMMARY OF THE INVENTION

The present invention provides a unique gum product comprising a soft gum core having a plurality of regions of different colors visible on an outer surface of the core, and a crunchy edible coating covering the outer surface of the core, the coating being substantially transparent such that the core regions of different colors are visible through the coating. The regions of different colors can also have different flavors.

The coating preferably comprises sorbitol as a primary ingredient, and can have various additional ingredients such as film-forming agents, binding agents, flavorings, sweeteners, and others. Notably, the coating does not include any dispersing or whitening agent such as titanium dioxide, which is commonly used in hard coatings for chewing gum, or any other ingredient that would make the coating opaque or otherwise impair the transparency of the coating. The gum product can be formed in any desired configuration including but not limited to stick, pellet, or ball form.

DETAILED DESCRIPTION OF PREFERRED EMBODIMENTS

The present invention now will be described more fully hereinafter with reference to certain preferred embodiments of the invention. This invention may, however, be embodied in many different forms and should not be construed as limited to the embodiments set forth herein; rather, these embodiments are provided so that this disclosure will be thorough and complete, and will fully convey the scope of the invention to those skilled in the art.

The gum product of the present invention has a relatively soft gum core and a hard, crunchy outer shell or coating that covers the core. The gum core has two or more regions of different colors, and the different colors can also have different flavors if desired. The gum core is preferably prepared by mixing two or more separate batches of gum mixture having different colors, and feeding the various gum mixtures to an extruder that coextrudes the gum mixtures to form a coextrudate. The coextrudate can be formed as a center portion surrounded by an outer portion of different color, as a laminated structure (e.g., two layers of different colors in face-wise disposition to each other), as a veined structure, as a swirled structure, or in any other desired configuration.

Each gum mixture includes a water-soluble bulk portion, a generally water-insoluble chewing gum base, and one or more flavoring and coloring agents. The water-soluble portion dissipates over a period of time during chewing, while the gum base portion remains in the mouth throughout the chewing process.

The insoluble gum base generally includes elastomers, resins, fats, oils, waxes, plasticizers, and inorganic fillers.

The elastomers may include polyisobutylene, isobutylene-isoprene copolymer, styrene butadiene rubber, natural latexes such as hevea brasiliensis, chicle, and jelutong, or the like.

The resins may include synthetic resin such as polyvinyl acetate with a molecular weight from about 5,000 to 100,000, natural resins such as glycerol ester of gum, wood, or tall oil rosin, partially or fully hydrogenated glycerol ester of gum, wood, or tall oil rosin, glycerol ester of polymerized gum, wood, or tall oil rosin, pentaerythritol ester of gum, wood, or tall oil rosin, methyl ester of partially hydrogenated gum, wood, or tall oil rosin, and terpene resins derived from delta limonene or α and β pinene, or mixtures thereof.

The fats and oils may include animal fats such as lard and tallow, or vegetable oils such as soybean, cottonseed oil, palm oil, coconut oil, or other fully or partially hydrogenated vegetable oils, and cocoa butter.

The waxes may also include petroleum waxes such as paraffin and microcrystalline wax, or natural waxes such as beeswax, candelilla wax, carnauba wax and polyethylene wax.

The gum base may also include filler such as calcium carbonate, magnesium carbonate, talc, dicalcium phosphate, or the like.

The gum base may also include plasticizers such as glycerol monostearate, glycerol triacetate, glycerin, lecithins, or the like.

The gum base may also include other ingredients such as antioxidants, colors, and emulsifiers or the like.

The present invention can employ any commercially acceptable chewing or bubble gum base. The gum base generally constitutes from about 5 to about 95% by weight of the gum core, and more typically about 20 to 75% of the gum core.

The water-soluble portion of the chewing gum core, which generally makes up from about 5 to about 95% by weight of the gum core, and more typically about 25 to 80% of the gum core, may include softeners, bulk sweeteners, high intensity sweeteners, flavoring agents, colors and combinations thereof.

Softeners in the gum, also known as plasticizers or plasticizing agents, such as glycerin, can be added to the chewing gum center in order to make the gum softer and more easily chewable.

Aqueous bulk sweetener solutions such as those containing sorbitol, xylitol, lactitol, maltitol, hydrogenated isomaltulose and other polyols, or combinations thereof, may also be used as softeners and binding agents in the chewing gum center.

Powder bulk sweeteners that can be used in the gum core may include sweeteners like sugar alcohols such as sorbitol, mannitol, xylitol, hydrogenated starch hydrolysates, lactitol, maltitol, hydrogenated isomaltulose, or the like, alone or in combination.

Bulk sweeteners generally make up about 5 to about 90% by weight of the gum core, and more typically about 10 to 80% of the gum core.

High intensity sweeteners may also be used and are commonly used with sugarless bulk sweeteners. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

High intensity sweeteners generally make up about 0.001 to about 5% by weight of the gum core, and more typically about 0.05 to about 2.0% of the gum core.

The sweetener may also function in the chewing gum in whole or in part as a water-soluble bulking agent.

The softener may also provide additional sweetness.

Flavoring agents that can be used in the gum core include essential oils and artificial flavors, or mixtures thereof, including natural oils derived from plants and fruits such as citrus oils, peppermint oil, spearmint oil, other mint oils, clove oil, oil of wintergreen, anise, and the like.

Artificial flavorings can comprise fruit flavors such as strawberry, cherry, banana, melon, or the like.

Essential oil and artificial flavoring agents may be combined in the gum core.

The flavoring agents generally make up about 0.05 to about 10% by weight of the gum core, and more typically about 0.1 to 5% of the gum core. The flavoring can be added both as liquid flavoring or in a mixture of liquid flavoring combined with spray-dried flavor or encapsulated flavoring.

In accordance with preferred embodiments of the invention, the gum core is formulated as shown in the following table:

TABLE I

Preferred Gum Core Composition

| Ingredient | Weight Percentage |
| --- | --- |
| Gum base | 20–75 |
| Lecithin | 0.1–2 |
| Sorbitol powder | 10–70 |
| Maltitol syrup | 1–20 |
| Glycerin | .0.1–10 |
| Mannitol | 1–10 |
| Citric acid | 0–5 |
| Aspartame | .05–2 |
| Flavors | 0.1–5 |
| Colors | 0.01–1 |

Each gum mixture used in the gum core is generally manufactured by sequentially adding the various chewing gum ingredients to any commercially available mixer known in the art to produce a batch of a gum mixture.

The batch size typically will be from about 20 kg to about 2000 kg. Generally, production of the batch starts with first melting the gum base and adding it to the running mixer. To insure homogenous mixture the other ingredients are added successively to the melted gum base. The cold gum base alternatively may be plasticized in the running mixer before adding other ingredients. Color and emulsifiers can be added at the beginning of the mixing procedure.

A softener such as liquid sorbitol or glycerin can be added next along with isomaltulose syrup and part of the powder bulk portion. Further parts of the liquid and powder bulk portion may then be added to the mixer.

The flavoring agents are typically added with the final part of the bulk portion. The entire mixing process typically takes from 5 to 25 minutes, although longer mixing times are sometimes required. Those skilled in the art will recognize that variations in this mixing procedure, or other mixing procedures, may be followed.

To produce the multi-colored gum in accordance with the present invention, two or more separate batches of gum are prepared in separate mixers as indicated above, each having a different color, and optionally a different flavor if desired.

After the ingredients have been thoroughly mixed, the gum mixtures are discharged from their respective mixers and are fed to a co-extruder or other suitable device that shapes the gum product into the desired form such as chunks or pellets for making dragees.

Alternative processes can be used, such as co-extruding a continuous sheet that is subsequently rolled, scored, and divided into pieces such as pellets or any other shape that can be coated, or any other suitable process for making the desired form. The product is shaped in such a way that at least two colors are visible on an outer surface of the product. Optionally, the product can also have two portions of two different flavors.

There can be a maturing time included after the discharge of the gum and feeding into the extruder, but this will depend on the gum and the available technology for forming the product.

Co-extrusion devices and processes, and devices for rolling and scoring, are well known in the art and hence are not further described herein.

After the chewing gum core has been manufactured, shaped, and optionally matured, the hard coating can be applied. Hard coatings of sorbitol are preferred in the present invention.

Such coatings are known, but prior sorbitol coatings have generally included ingredients that make the coatings opaque and colored. A typical sorbitol coating composition, for example, is formed by preparing a saturated liquid sorbitol syrup that contains from about 60 to 78 weight percent of sorbitol powder (the weight percent required to reach the saturation point being dependent on the syrup temperature) dissolved in a solvent such as water, and adding various other ingredients as desired. The sorbitol/water mixture can be a commercially available liquid sorbitol comprising sorbitol solids dissolved in water, which is typically sold as a 70% concentration liquid sorbitol (i.e., a solution comprising 70% sorbitol solids by weight and the remainder water). The coating syrup generally also includes some type of dispersing agent for the purpose of whitening and tack reduction. Commonly used dispersing agents include titanium dioxide and talc.

However, in accordance with the present invention, the hard sorbitol coating must be transparent so that the multi-colored appearance of the gum core can be seen through the coating. Accordingly, the coating composition used for making the hard coating is free of any ingredients that would make the resulting coating opaque, and preferably is also free of any colorants. Thus, titanium dioxide or similar dispersing agents are not used.

The sorbitol coating composition can include other ingredients such as thickeners, flavoring agents, artificial sweeteners, film formers, and binding agents. Flavoring agents contemplated by the present invention include essential oils and artificial flavors, or mixtures thereof, including but not limited to oils derived from plants and fruits such as citrus oils, fruit essences, peppermint oil, spearmint oil, other mint oils, clove oil, oil of wintergreen, anise and fruit flavoring or the like.

Artificial sweeteners contemplated for use in the coating may include but are not limited to synthetic substances such as saccharin, thaumatin, alitame, saccharin salts, aspartame, sucralose, and acesulfame-K.

Film-forming agents that can be added to the coating syrup include but are not limited to methyl cellulose, gelatins, hydroxypropyl cellulose, ethyl cellulose, hydroxyethyl cellulose, carboxymethyl cellulose, and the like, or combinations thereof.

Binding agents may be added either as an initial coating on the chewing gum core or may be added directly into the syrup. Binding agents contemplated by the present invention include alginate, cellulosics, vegetable gums, or the like.

The coating syrup preferably includes a thickener such as gum arabic, gelatin, carrageenan, or the like. Preferred types of gum arabic are the instantly soluble types, but slow dissolving types alternatively can be used.

Suitable ranges of ingredient weight percentages of a gum product (based on weight of the finished gum piece comprising the gum core and the coating) in accordance with preferred embodiments of the invention are given in the following Table II:

TABLE II

Preferred Gum Product Formulation

| Component | Weight Percentage |
| --- | --- |
| Gum core | 50–95 |
| Sorbitol powder | 0–50* |
| Liquid sorbitol (70%) | 0–50* |
| Citric acid | .1–2 |
| **Gum arabic | 0–5 |
| **Gelatin | 0–5 |
| **Carrageenan | 0–5 |
| Water | 2–30 |
| Flavors | .01–2 |

*Although Table II lists both sorbitol powder and liquid sorbitol, typically only one or the other of such ingredients will be used in a given product.
**Although Table II list gum arabic, gelatin, and carrageenan, typically only one of such ingredients will be used in a given product.

The proportions between the gum core and the coating generally will range between 10:1 and 1:10. The weight of a gum piece will generally be between about 0.5 gram and 10 grams.

The ingredients of the coating syrup preferably are heated and mixed thoroughly to a uniform temperature. It is important that the thickener be fully dissolved in the syrup.

The coating syrup is then stored at a temperature of about 10° C. to about 90° C. Once the sorbitol syrup has been prepared, the syrup may be mixed with, sprayed upon, poured over, or added to the gum cores in any way known to those skilled in the art.

For example, the hard coating process can be carried out in a rotating pan. Gum cores to be coated are placed into the rotating pan to form a moving mass. The syrup is applied or distributed over the gum cores. Once the coating has dried to form a hard surface, additional syrup additions can be made to produce a plurality of coatings or multiple layers of hard coating.

Any suitable coating equipment may be used when practicing the invention. Examples of such equipment include traditional coating pans as well as newer, high technology systems such as those produced by Driam of Germany, Dumoulin of France, and Latini.

In the hard coating panning procedure, the coating syrup is generally added to the gum cores at a temperature of from about 10° C. to about 90° C., and more preferably from about 30° C. to about 70° C. The coating on the gum cores may be applied in a single hard layer or in a plurality of hard layers.

In general, applying a plurality of layers involves applying a single coat, allowing the coat to dry, and then repeating the process obtains a plurality of layers. Any number of coats may be applied to the gum cores. Preferably, the gum cores are coated with about 30 to 70 layers.

Once a portion of syrup is applied to the gum cores, the wet syrup coating is dispersing on the cores and dried; such drying is done by forced-air drying in a temperature range of from about 15° C. to about 45° C. The drying air should have relative humidity below 50% RH. Each application of a wet syrup coating to the gum pieces is followed by a distribution period without air and then a forced-air drying of the coating, and the coating and drying steps are alternated until the desired numbers of coating layers have been deposited on the gum pieces.

A sealing coating of food-grade wax (e.g., carnauba wax or the like) may be applied over the hard coating, if desired, in order to seal the crunchy coating to reduce the exposure of the coating to atmospheric moisture.

EXAMPLE NUMBER 1:

Two differently colored and differently flavored gum mixtures A and B are prepared in the manner described above for forming the gum cores, in accordance with the compositions in the following Table III:

TABLE III

| Gum Mixture A | | Gum Mixture B | |
| --- | --- | --- | --- |
| Ingredient | % (w/w) | Ingredient | % (w/w) |
| Gum Base | 32.0 | Gum Base | 38.0 |
| Lecithin | 0.2 | Lecithin | 0.2 |
| Sorbitol powder | 48.0 | Sorbitol powder | 43.0 |
| Maltitol syrup | 11.7 | Maltitol syrup | 9.7 |
| Glycerin | 1.0 | Glycerin | 2.0 |
| Mannitol | 5.0 | Mannitol | 5.0 |
| Citric Acid | 0.8 | Citric Acid | 0.8 |
| Aspartame | 0.2 | Aspartame | 0.2 |
| Strawberry Flavor | 1.0 | Banana Flavor | 1.0 |
| Red Color | 0.1 | Yellow Color | 0.1 |

The two gum mixtures A and B are fed to an extruder, which coextrudes the mixtures to produce a two-color coextrudate that can be shaped in various forms as previously noted. For the purposes of the present example, it is assumed that the gum cores are pellets. Maturing time after mixing and before co-extrusion can be included if desired, as previously noted.

A coating composition A is prepared according to the composition in the following Table IV:

TABLE IV

Coating Composition A

| Ingredient | % (w/w) |
|---|---|
| Sorbitol Powder | 72.5 |
| Water | 25.0 |
| Gum Arabic | 1.0 |
| Citric Acid | 0.8 |
| Strawberry Flavor | 0.7 |

Particularly when the gum has a fruit flavor, it is preferred to add an acid such as citric acid to the coating syrup. Citric acid or acids in general can be dissolved either in the coating suspension itself, or they can be added as powder or can be added after dissolving the acid in a small amount of coating suspension or water. When the acids are added separately they are normally added either at one time or more during the coating procedure. When present, the acid generally comprises from about 0.1 to 10 percent by weight of the coating syrup.

The flavoring is normally added on its own either at one or more times during the coating process.

The gum cores are coated with the coating composition in accordance with the process previously described. Once the desired thickness of the hard coating has been developed on the gum cores and the coating has dried, the gum pieces are polished with a polishing wax such as carnauba wax or mixtures of various polishing waxes known in the art. The gum pieces can then be wrapped and packaged in any desired manner.

EXAMPLE NUMBER 2:

Gum cores are prepared in the same manner as set forth in Example Number 1. A coating composition B is prepared in accordance with the formula in the following Table V:

TABLE V

Coating Composition B

| Ingredient | % (w/w) |
|---|---|
| Liquid Sorbitol 70% | 97.5 |
| Citric Acid | 0.8 |
| Gelatin | 1.0 |
| Banana Flavor | 0.7 |

The gum cores are coated with the coating composition and the resulting gum pieces are polished as described in Example Number 1.

Many modifications and other embodiments of the invention will come to mind to one skilled in the art to which this invention pertains having the benefit of the teachings presented in the foregoing descriptions and the associated tables. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A chewing gum product comprising:
   a gum core having a plurality of regions of different colors visible on an outer surface of the core; and
   a crunchy edible coating covering the outer surface of the core, wherein the coating comprises sorbitol, is substantially transparent, and is free from any ingredients causing the coating to become opaque, such that the core regions of different colors are visible through the coating.

2. The gum product of claim 1, wherein the coating comprises sorbitol, a binding agent, and a flavoring agent.

3. The gum product of claim 2, wherein the coating is free of any whitening agent.

4. The gum product of claim 1, wherein the core regions of different colors also have different flavors from one another.

5. The gum product of claim 1, wherein the gum product is formed as a coatable stick or chunk.

6. The gum product of claim 1, wherein the gum product is formed as a pellet.

7. The gum product of claim 1, wherein the gum product is formed as a ball.

8. The gum product of claim 1, wherein a weight ratio of the gum core to the coating is between 1:10 and 10:1.

9. The gum product of claim 1, wherein the gum core comprises about 50 percent to 95 percent of the gum product by weight.

10. The gum product of claim 1, wherein the coating comprises a sorbitol coating present in an amount of about 5 percent to 50 percent by weight of the gum product.

11. The gum product of claim 1, wherein the coating is formed from one of sorbitol powder or 70% dry solids sorbitol syrup.

12. The gum product of claim 1, wherein the coating is formed from a fluid coating composition that comprises 70% liquid sorbitol solution present in an amount exceeding 90 percent by weight of the coating composition.

13. The gum product of claim 1, wherein the coating is formed from a fluid coating composition that comprises sorbitol powder present in an amount of 50 percent to 80 percent by weight of the coating composition.

14. The gum product of claim 1, wherein the gum product has an essential oil or fruit flavor and the coating is applied to the gum core as syrup to which acid is added in an amount from 0.1 percent to 10 percent by weight of the syrup.

* * * * *